Feb. 7, 1967  R. T. SMITH, JR  3,303,509
RECORDER
Filed Jan. 29, 1965  2 Sheets-Sheet 1
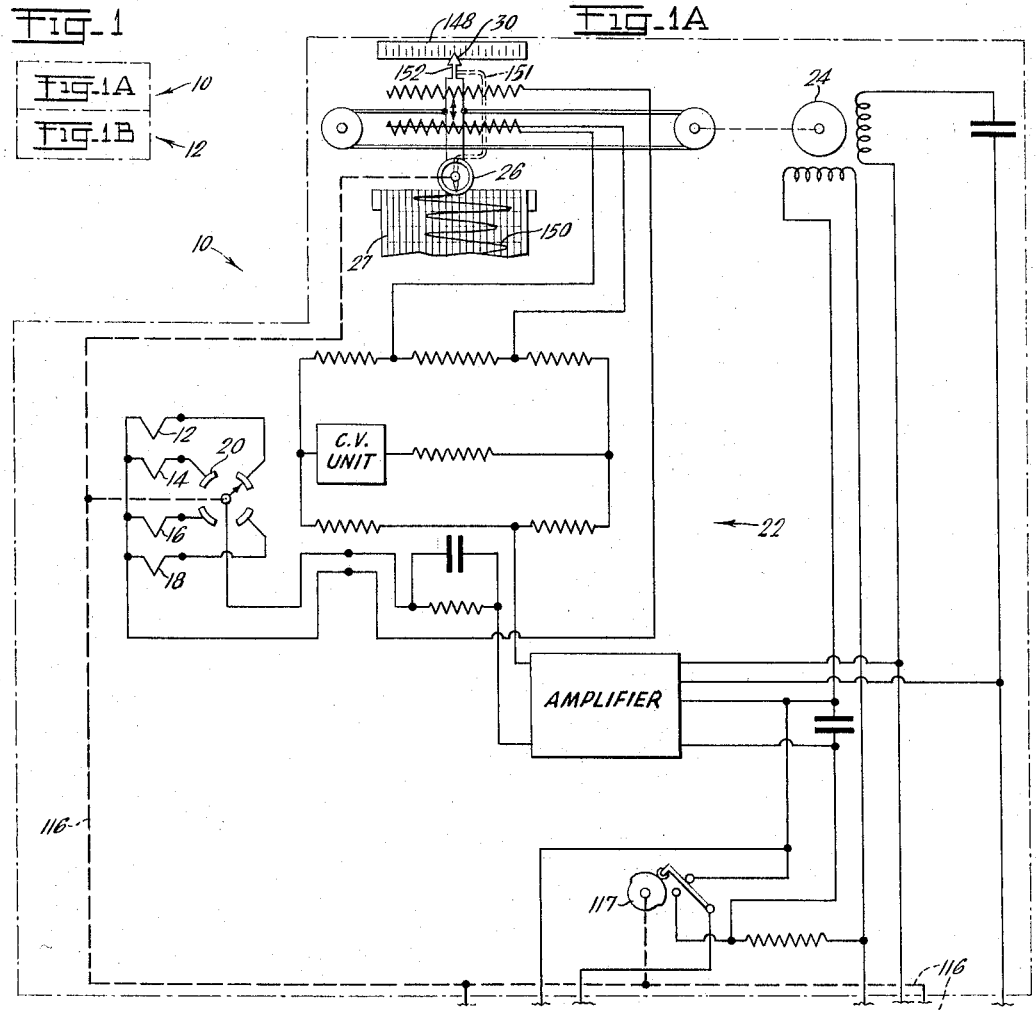
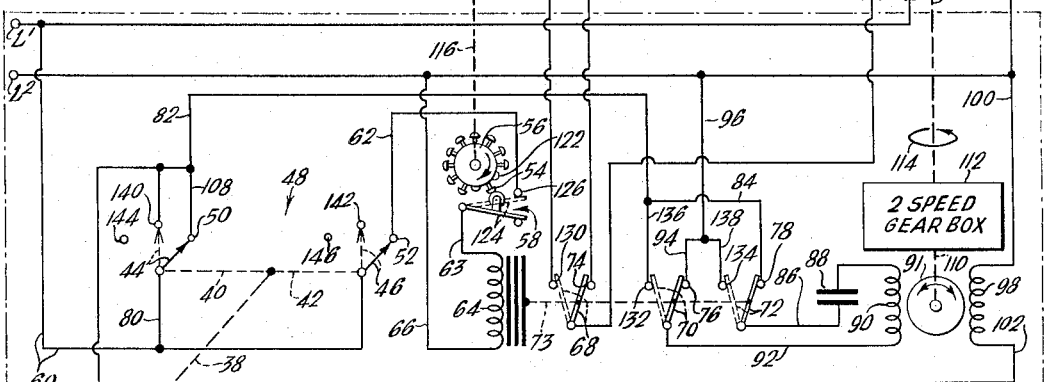
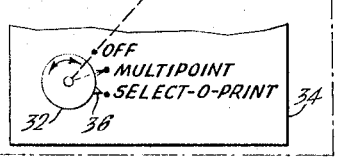
INVENTOR.
ROBERT T. SMITH JR.
BY Arthur H. Swanson
ATTORNEY Feb. 7, 1967  R. T. SMITH, JR  3,303,509
RECORDER
Filed Jan. 29, 1965  2 Sheets-Sheet 2
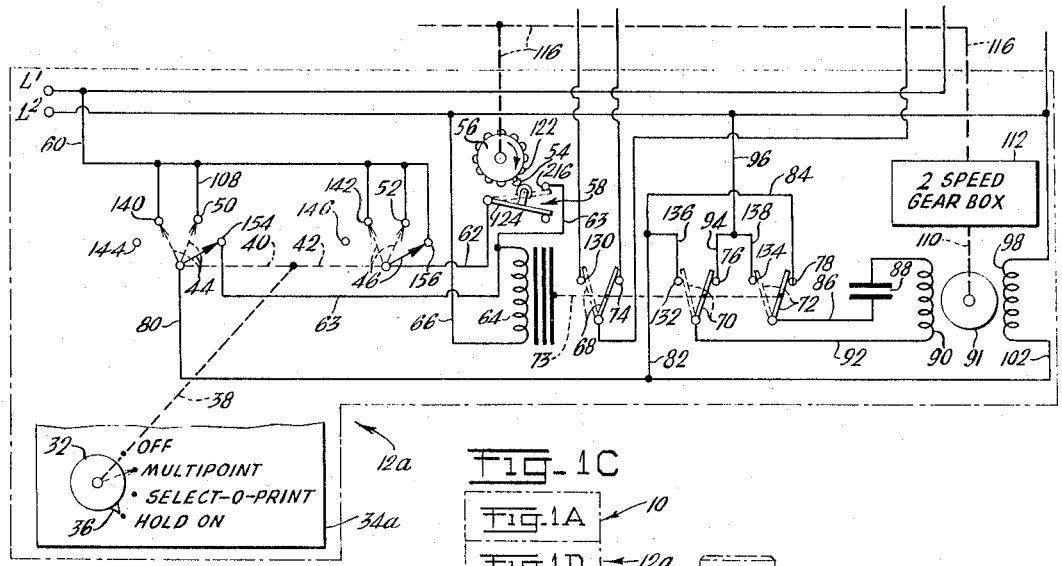
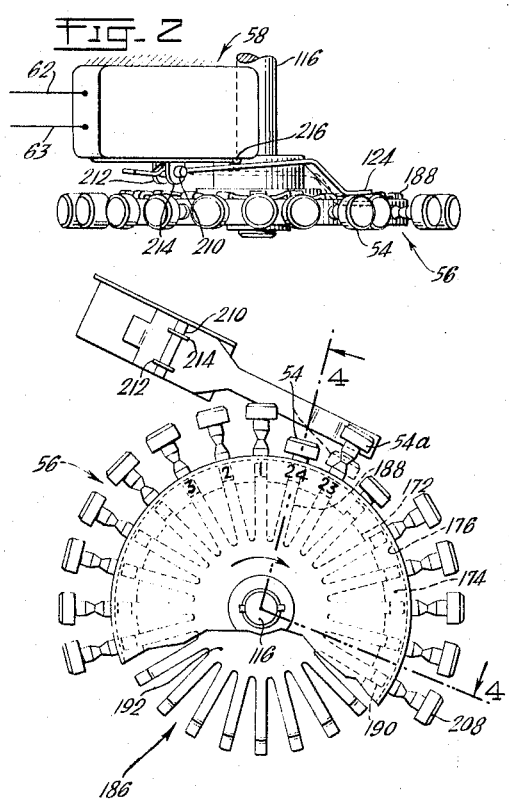
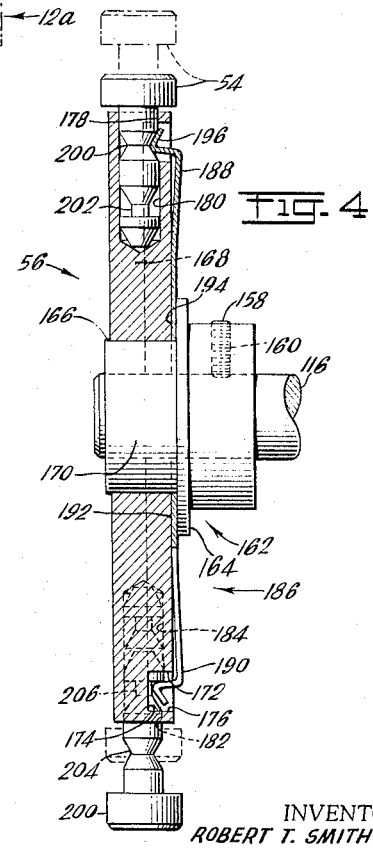
INVENTOR.
ROBERT T. SMITH JR.
BY Arthur H. Swanson
ATTORNEY

United States Patent Office 3,303,509
Patented Feb. 7, 1967

3,303,509
RECORDER
Robert T. Smith, Jr., Hatboro, Pa., assignor to Honeywell Inc., Minneapolis, Minn., a corporation of Delaware
Filed Jan. 29, 1965, Ser. No. 428,948
6 Claims. (Cl. 346—34)

The present invention relates to improvements in recording instruments that are employed to print a plurality of records on a chart.

The multi-record printing is accomplished through the use of a print wheel that is indexed for each measurement to bring into printing relation with the chart a type character selected to identify the variable being measured. The print wheel is moved to a position along the chart corresponding to the instantaneous value of the variable being measured, and then is pressed thereagainst momentarily.

Each of the type characters is often made of a different form than the other characters. In some uses of the recorder, a single color is made use of, and in others, if desired, each character is printed in a different colored ink.

The recorder also contains an ink wheel pad for inking the type characters on the type of print wheel and oftimes mounts this ink pad wheel on a chassis independent of the mounting for the print wheel.

This ink pad wheel and print wheel construction allows a single recording instrument to print as many colors as there are in the type characters to be employed. These multi-point recorders often employ as many as twenty-four (24) type characters and eight (8) ink pads, so that eight (8) groups of three (3) type characters each can be printed in the same color which differs from the colors of the other seven (7) groups. With this arrangement, each type character is synchronized with one ink pad so that each time a type character is selected, the proper ink pad is also selected.

The recorder provides:

(1) Selective print recording or recording that is brought about by threadedly moving inwardly buttonhead screws on a Select-O-Print wheel that inactivates points whose magnitude is not to be recorded and sequentially reverses a multi-point drive motor which, in turn, drives the multi-point gear reduction drive mechanism and print wheel at a faster speed when a lever-actuated clutch is moved to a first position. Under this condition, it is possible to print the changing values of more than one (1) but less than all of the variables the recorder can accommodate or to print the changing values of all of the variables the recorder can accommodate.

Under a condition in which the aforementioned lever is shifted to a different second position from that referred to above, this Select-O-Print type of recording will enable the print wheel to be connected to print in sequence the changing values of a single variable.

(2) Multi-point or recording that is brought about by threadedly moving in an outward direction all of the previously-mentioned threadedly-moved-in buttonhead screws on the Select-O-Print cycle selector wheel and connecting the print wheel in such a manner that successive type characters on the wheel will be printed on a chart in sequence.

A detailed showing and description of the component parts that are employed in the aforementioned type of multi-point selective print recorder is disclosed in its entirety in the Jacques Behmoiras patent application Serial No. 257,599, filed February 11, 1963, now Patent No. 3,216,015.

It is an object of the present invention to disclose pins for the aforementioned Select-O-Print cycle selector wheel that can be readily pushed in a radial manner inwardly of the peripheral surface of the wheel so that it will take less time to select the points that are to be recorded under a Select-O-Print operation than has heretofore been required when threadedly-mounted buttonhead screws have been employed for this purpose.

It is still another object of the present invention to disclose a knob-actuated switching circuit which can directly and electrically switch the recorder from a Select-O-Print recording apparatus to a multi-point recording apparatus and without being required to follow the previous practice of sequentially unclutching the multi-point gear drive and clutching in a Select-O-Print gear drive and adjusting in an outward direction the aforementioned buttonhead screws or pins on the Select-O-Print wheel.

It is another object of the invention to disclose an additional alternate switching circuit that can be cut in with the printing mechanism by rotation of the aforementioned knob to a "hold-on" position so that the recorder can be instantaneously connected to bypass all but any selected one of a single one of the points or variables under measurement. The point is selected by pulling out a single one of the pins on the Select-O-Print wheel to thereby, figuratively speaking, "hang on" to that selected point so that the recorder can indicate on an indicating scale of the recorder any instantaneous changes that take place in the magnitude of that selected point or variable.

It is another object of the invention to provide a removable pen for mounting in a recording position on the non-indicating end of the recorder's indicating pointer that is, in turn, mounted for longitudinal movement along a chart with the non-recording print wheel when the recorder is placed in its "hold-on" operating position.

A better understanding of the present invention may be had from the following detailed description when read in connection with the accompanying drawings, in which:

FIGURE 1 shows, in block diagram form, the manner in which the multi-point measuring and print wheel balancing circuits disclosed in the previously-mentioned Jacques Behmoiras patent application Serial No. 257,599, filed February 11, 1963, as shown in FIGURE 1A is combined with the unique knob-actuated electric Select-O-Print circuit as shown in FIGURE 1B;

FIGURE 1A is a diagram showing the balancing and measuring circuits employed in the combined electro-mechanical circuits set forth under the description of FIGURE 1;

FIGURE 1B is a diagram showing the unique knob-actuated electric Select-O-Print circuit employed in the combined electro-mechanical circuit set forth under the description of FIGURE 1;

FIGURE 1C shows, in block diagram form, the manner in which the multi-point measuring and print wheel balacing circuits described in the previously-mentioned Jacques Behmoiras patent application Serial No. 257,599, filed February 11, 1963, as shown in FIGURE 1A, can be combined with the unique knob-actuated electric "hold-on" circuit, as shown in FIGURE 1D;

FIGURE 1D is a diagram showing the unique knob-actuated "hold-on" circuit employed in the combined electromechanical circuit set forth under the description of FIGURE 1C;

FIGURE 2 shows, in detailed form, a plan view of the unique Select-O-Print wheel and the pull-out pins and switch associated therewith;

FIGURE 3 shows a partial front view of FIGURE 2, and

FIGURE 4 shows a sectional view of the Select-O-Print wheel taken along the line 4—4 of FIGURE 3.

FIGURE 1 of the drawing shows how the previously-mentioned multi-point measuring and print wheel balancing circuit 10 disclosed in FIGURE 1A is combined with the unique knob-actuated electric Select-O-Print multipoint circuit 12 to be hereinafter described.

FIGURE 1A shows a diagram of the measuring and print wheel balancing circuit 10 that is disclosed in detail in the aforementioned Jacques Behmoiras patent application Serial No. 257,599, filed February 11, 1963. This circuit is comprised of a plurality of separate thermocouples 12, 14, 16, 18 each of which is employed to sense the magnitude of a variable condition under measurement such as temperature, a selector switch 20 to selectively cut in each of the thermocouples 12–18 with a null balancing circuit 22 which contains a balancing motor 24 for driving a print wheel 26 across a chart 27 to a balanced position. When the print wheel 26 is in this position, the magnitude of each of the variables under measurement in identifiable characteristic form can be separately printed on charts by means of a print wheel cam-actuating switching means that is disclosed in the aforementioned patent application Serial No. 257,599.

An indicating pointer 30 is also carried by the carriage about which the print wheel is moved into and out of a printing position with the chart.

The Select-O-Print multi-point switching circuit 12, shown in FIGURE 1B, employs a single rotatable knob 32 mounted for rotation on a panel 34. When the pointer 36 of the knob 32 has been turned to the Select-O-Print position, as shown in FIGURE 1B, the mechanical linkage 38, 40, 42 schematically shown associated with this knob will rotate the wiper contacts 44, 46 of the switch 48 into engagement with the contact points 50, 52.

If the pin 54 is pulled out on the Select-O-Print wheel 56 when the switch 48 is in the aforementioned position, the blade of the toggle switch 58 will be displaced to its lower solid-line position. It can, thus, be seen that, under this condition, current cannot be transmitted from the power supply $L^1$, conductors 60, 62, switch wiper 46, conductor 63 to the relay 64 which, in turn, is connected by way of the conductor 66 to power line $L^2$.

When the relay 64 is disconnected from its power source in the aforementioned manner, it will be de-energized and the three (3) switch blades 68, 70, 72 associated therewith will be placed by means of a spring-loaded mechanical connection 74 in their solid-line positions against their associated contact parts 74, 76, 78, as shown in FIGURE 1B.

Under the aforementioned non-energized relay switch condition, it can be seen that current will flow from power supply $L^1$, conductors 60, 80, wiper 44, contact 50, conductors 82, 84, contact points 78, wiper 72, conductor 86, capacitor 88, motor coil 90 of motor 91, conductor 92, switch blade 70, contact 76, conductors 94, 96 to $L^2$ to energize the coil of the motor and cause it to be rotated in a first direction.

When in the aforementioned non-energized relay switched-in position, the remaining coil 98 of the motor 91 will be connected by way of conductor 100 to $L^2$ at one of its ends and connected to conductors 102, 108, wiper 44, conductors 80 and 60 to $L^1$.

When rotation of the motor 91 in the aforementioned selected direction is transmitted by way of the motor shaft 110 to a two-speed reduction gear box 112, the speed gear 112, in turn, will transmit its lower one of two (2) rotary speed motions in the direction of the arrow 114 by way of the mechanical shaft 116 to a balancing motor shorting-out cam 117, the Select-O-Print wheel 56 and the actuating mechanism associated with the print wheel 26.

If, in the Select-O-Print recording operation, the Select-O-Print wheel 56 is rotated in the direction of the arrow and a depressed pin, for example pin 122, is brought into the position which is now shown occupied by the pulled out pin 54, the switch-contacting blade 124 of this toggle switch 58 will be moved from its previously-described solid-line position to its dotted-line position and into contact with the switch contact point 126.

Under the aforementioned switch contact position it can be seen from observing FIGURE 1B that power from the electric supply line $L^1$ will be transmitted by way of conductor 60, the wiper 46 (shown in solid-line form), conductor 62, switch contact 126, switch blade contact 124 of the toggle switch 58, conductor 63 to the relay coil 64, conductor 66 to $L^2$ to place the relay 64 in an energized condition.

When the relay 64 is energized in this manner, it will actuate the mechanical connection 74 and simultaneously cause the blades 68, 70, 72 to be shifted from their solid-line position into their respective dotted-line contact positions with contact points 130, 132, 134. This will permit current from power lines $L^1$ to flow by way of conductors 60, 80, switch wiper 44, contact point 50, conductors 108, 82, 136, contact points 132 to the switch blade 70 (shown in dotted-line form), conductor 92, the coil 90 of the reversible motor 91, capacitor 88, conductor 86, switch blade 72 (shown in dotted-line form), contact 134, conductors 138 and 96 to $L^2$.

From the aforementioned description, it can be seen that the polarity of the motor coil winding 90 is altered when in a Select-O-Print position and the switch 58 is moved from the solid-line, open-toggled, de-energizing relay switch position to its dotted-line closed energizing relay toggle switch position. This action will enable the motor to be rotated in a direction opposite to that previously described in which the pin 54 of the Select-O-Print wheel 56 was in a pulled-out positon. When this reverse rotation of the motor shaft 110 occurs, it will cause the speed of the shaft 116 of the two-speed reduction unit 112 to be increased to its higher speed in the direction of the arrow 114. The movement of the switch 68 to its dotted-line position by relay 64 will allow the motor balancing operation of the balance motor 24 to be cut out for the variable associated with the depressed pin so that the Select-O-Print wheel 56 can be moved to the next pulled-out pin thereon which represents the next variable point whose magnitude is to be recorded on chart 27.

When the pointer 36 and knob 32 is rotated from the previously-described Select-O-Print position to a multi-point position, the wipers 44, 46 of switch 48 will be moved by the mechanical linkages 38, 40, 42 associated with the knob from their solid-line to their dotted-line positions as shown in FIGURE 1B.

When the wipers 44, 46 are in this position, they will be in contact with their respective switch contact points 140, 142.

It can be seen that, since the electric circuit extending from $L^1$, conductor 60 to the toggle switch 58 is broken by the now-open switch 46, the power to the relay 64 will be broken and it will become de-energized and the direction of the rotation of the motor will cause the gear reduction unit 112 to rotate its output shaft 116 at the lower of its two speeds in a manner similar to that described for the Select-O-Print operation supra where a pin 54 was pulled to its outermost position.

It can further be seen that, since the relay 64 remains de-energized due to the open switch 46, the motor 91 will continue to print the magnitude of all of the variables or points represented by each and every one of the pins on the Select-O-Print wheel regardless of whether the pin is in a pulled-out or a pushed-in position.

From the aforementioned description of the knob-actuated switch 48, it can be seen that a switch from a Select-O-Print to a multi-point position of the switch can be accomplished without following the previous practice of pulling out all of the pins on the Select-O-Print wheel that were pushed in before such a switching action could take place.

It should also be understood that the aforementioned knob-actuated switch 48 enables the electric circuits just described to also be shifted from this multi-point control position directly back to the previously-mentioned Select-O-Print position in the reverse fashion of that just described.

FIGURE 1B shows two (2) OFF switch contact point positions 144, 146 into which the switch blades 44, 46 are brought into contact with when the pointer 36 of the knob 32 moves the switch 48 to the OFF position shown on the panel 34. When the switch 48 is placed in this OFF position, it can be seen that the power from $L^1$ to the coils 90, 98, of the motor 91 will be immediately cut off. This action will prevent any further sequential rotation of the shaft 116 on which the Select-O-Print cycle wheel 56 is mounted from taking place. One of the chief purposes of making use of an OFF position switch is to provide a non-rotatable position for the Select-O-Print cycle wheel 56 when it is desired to alter the arrangement as to which pins on the wheel 56 are to be pushed in or pulled out when a change is required in the selection of the different variables or points under measurement that are being recorded, for example, by the print wheel 26 on the chart 27.

The multi-point selector switch circuit in FIGURE 1D is substantially the same as that disclosed in FIGURE 1B except insofar as the connections to the front panel selector switch 48a are concerned. These connections have been altered slightly from the connections shown for the switch 48 in FIGURE 1B to merely accommodate the addition of a "hold-on" position of the overall switching circuit 12a which is effected by moving the knob 32 on the panel 54a to this "hold-on" position.

When it is desired to move the knob to the "hold-on" actuating switch position shown for the circuit 12a in FIGURE 1D, it is first necessary to select one of the variables or points under measurement, for example 12, 14, 16, 18 (shown in FIGURE 1A), whose magnitude you desire to have continually indicated on the indicating scale 148 by means of the print wheel carriage mounted indicator 30 and to be indicated in line form 150 on a chart 27 as shown in FIGURE 1A. This latter recording operation can be accomplished by hanging a portable pen 151 on the print wheel indicating carriage 152. This can be done by pushing in all of the pins on the Select-O-Print cycle wheel 56 into their pushed-in position except a single pin, for example pin 54, which is associated with a selected one of the variables or points under measurement whose magnitude it is desired to have indicated and recorded. While this pin-pushing-in operation can be accomplished when the switch is in a Select-O-Print or multi-point position, it may be more easily accomplished by placing the switch in the OFF position, as previously described, which action will prevent the motor 91 from transmitting motion to the Select-O-Print cycle wheel 56.

When the aforementioned pin-adjusting operation has been completed, the indicating pointer 36 on the knob 32 of switch 48a can then be turned to the "hold-on" position on the panel 34a. While this occurs, the linkage 38, 40, 42 will cause the wipers 44, 46 to be moved into engagement with their associated contact points 154, 156. If, at the time the knob is rotated to the "hold-on" position, the swich blade 124 of switch 58 is in its dotted-line relay energizing position with the head of the depressed pin 122 engaged, the motor 91 and associated gear reduction unit 112 will then cause the shaft 116 of the Select-O-Print cycle to be moved in a rapid stepped-up fashion over each point until the switch engages the single pulled-out pin 54 at which point the motor 91 and the wheel 56 will cease to rotate.

Under this "hold-on" condition, the switch 48a is connected to direct the electric power passing from the power line $L^1$ to the switch 58 to the motor coils 90, 98 so that the action of the switch 58 itself can simultaneously be used to effect a cutting off of the transmited electric power to the relay 64 and the coils 90, 98 of the motor 91.

While the depressed pins on wheel 56 are moved with respect to a blade 124 to switch 58, the blade 68 will be in its dotted-line position and the balancing motor shorting-out cam 117 will thus be connected to cut out the balancing motor 24 and a cam mechanism on the shaft associated with the print wheel 26, as is set forth in the previously-mentioned Jacques Behmoiras patent application Serial No. 257,599, filed February 11, 1963. This action will prevent the print wheel 26 from printing the non-selected variables or points on the chart 27 represented by each of the pushed-in pins.

When the wheel 56 has completed the aforementioned rotation with switch 58 in a relay energized position, the wheel 56 will be brought into the non-rotary position when the pulled-out pin 54 moves the blade 124 of the switch 58 to its relay de-energizing position for reasons similar to those previously described.

Under this "hold-on" position the de-energized relay 64 will have moved the blade 68 to its solid-line position to cut in the balancing motor 24 to allow the print wheel carriage with its indicator 30 and hang-on recording pen 151 to be moved across their respective scales 148 in chart 27 while the print wheel 26 remains in a non-printing position off and away from the chart 27 in the manner disclosed in the aforementioned Jacques Behmoiras patent application Serial No. 257,599.

FIGURES 2, 3 and 4 show, in a more detailed form than FIGURES 1B and 1D, the switch 58, the Select-O-Print cycle wheel 56 and a typical section taken through the wheel to show, by way of example, how one of the many pins 54 are retained in an insertable pushed-in position and a retractable pulled-out position.

The Select-O-Print cycle wheel 56, as is best shown in FIGURES 3 and 4, is fixedly retained by a suitable number of set screws, for example 158, on the motor drive shaft 116.

The aforementioned set screw 158 is shown in threaded engagement at 160 with a hub portion 162. This hub portion 162 has a shoulder 164 at one of its ends and a staked ring portion 166 at its other end to retain disc-shaped portion 168 of the wheel 56 on the cylindrical portion 170 of the hub portion 162.

The disc-shaped portion 168 of the wheel 56 has a circular channeled-out portion formed by the circular wall portions 172, 174, 176. The outer peripheral wall of the disc portion 168 has a series of equally-spaced-apart, bored-out, aligned pairs of radially-spaced-apart cylindrical wall portions 178, 180; 182, 184 to accommodate the slidable insertion of a pin such as the pin 54 therein.

The spring 186 is shown in the form of a spider having a plurality of radially-spaced-apart, pin-retaining arms, for example 188, 190, fixedly retained on the hub portion 170 by the shoulder 164 that retains its central portion 192 in a pressed engagement against the right side surface 194 of the disc 168.

The bent portions 196, 198 associated with each of the arms 188, 190 are employed to engage the grooved-out pin portions 200, 202; 204, 206 to keep the pins 54 and 208 in a respective pushed-in or pulled-out position when the pins are manually moved to either of these positions.

The toggle switch 58 associated with the pins, for example 54, 208 and the other pins on the Select-O-Print cycle wheel 56, preferably is provided with a bent lever portion 124. This lever 124 is pivotally mounted at a portion between its ends on a pivot shaft 210 that, in turn, is mounted for rotation on the bearing support members 212, 214 that are, in turn, fixedly connected to a stationary, spring-biased, button-actuated switch 216.

FIGURE 2 shows, in dotted-line form, the right end of the lever 124 in contact with a pulled-out pin 54a and another portion of the lever 124 in contact with and applying a force to the spring-biased button 218 of the switch 216.

FIGURE 2 also shows in dotted-line form the position the right end of the lever 124 will be in when the Select-O-Print cycle wheel 56 is moved so that a pushed-in pin, for example pin 54, is moved from its solid-line position to its dotted-line position, as is best illustrated in FIGURE 3.

In this latter-mentioned position, the lever 124 will be moved out by the spring-biased button 216 to effect an opposite union of the contacts (not shown) that are within the toggle-actuated switch 58 from that which occurred when the button 216 was held in by a pushed-out pin.

From the aforementioned description, it can be seen that a print cycle selector wheel 56 has been disclosed that is provided with pins 54, 202 that can easily be manually moved into and retained by the arms of a spider-type spring in their insertable pushed-in position and which may also be manually moved to a retractable pulled-out position and retained in that position by this spider-type spring.

From the aforementioned description, it can also be seen that a knob-actuated switching circuit has been disclosed which has the unique distinction of being able to directly switch a recorder back and forth between a Select-O-Print recording control position, in which the magnitude of selected points on the aforementioned print cycle selector wheel can be recorded, and a multi-point recording control position, in which all of the magnitudes or the points on the wheel are recorded, without being required to pull out all of the pins on the wheel. Optionally, this knob-actuated switching circuit can also have a unique distinction of being able to be switched to a "hold-on" position in which the recorder can be employed to indicate and record instantaneous changes taking place in the magnitude of any single one of the variables or points under measurement.

What is claimed is:

1. A switching circuit for a recording apparatus employing an electromechanical Select-O-Print multi-point recording circuit, comprising a rotatable print cycle selector wheel having a plurality of radially-spaced-apart adjustable puffed-out and pushed-in pins on its outer peripheral surface, a toggle switch electrically connected to an electric power source, the toggle switch being operably positioned to successively contact only the sides of pulled-out pins and to remain in an open-switch position when the pin cycle selector wheel is rotated and each of the pulled-out pins is retained in said side contact therewith, the toggle switch being further operably connected to be self-biased out of physical contact and into a closed-switch position when it is rotated to a position immediately above a pushed-in pin, a relay-operated switching circuit electrically connected with the toggle switch, a reversible motor gear reduction drive unit operably connected to rotate the wheel at one of two different speeds when the toggle switch is in contact with a pulled-out pin and the motor is thereby electrically energized by a current flowing from the power source, the relay-operated switching circuit being further operably connected to rotate the wheel at the other one of the two different speeds when the toggle switch is adjacent a pushed-in pin and thereby out of contact with the pins and the flow of current to the relay is thereby cut in, and a manually-operated electric switching circuit to cut out the power source to the relay to thereby make ineffective the energizing function of the relay when a pulled-out pin contacts the toggle switch, and the manually-operated switching circuit thereby being operative to retain the speed of the gear reduction drive at a selected one of said two mentioned speeds.

2. The switching circuit defined in claim 1, wherein the selected one of the two selected speeds is of a lower speed than the other.

3. A single switch-actuated electromechanical circuit for directly converting a recording apparatus employed to print a magnitude of a series of variables in succession into a recording apparatus that will print the magnitude of the variables in randomly selective sequence and for reconverting the recorder into a series recorder, comprising a power source, a two-speed drive unit, a relay, the relay being associated with the unit to drive it at one or the other of two speeds depending on whether it is energized or de-energized, a movable print cycle selector means connected in driving relation with the two-speed driving unit, a first switch operably connected to the selector means, the relay and said power source, the first switch being operably connected to energize the relay when the print cycle selector means is in one position and to de-energize the relay when it is moved to another position, and a second switch operably associated with the first switch to cut off the power being transmitted to the first switch from the power source and thereby maintain the windings of the relay in a de-energized condition when the print cycle selector means is in either of its two positions.

4. The recording apparatus defined in claim 3, wherein the second switch is operably connected for movement to another switch position, an electric circuit is provided to extend between the first and second switches to direct the power from the power source through the first switch to the motor when the switch is in the last-mentioned position, thereby to enable the first-mentioned switch to cut off the power flowing from the power source to the relay and motor.

5. The recording apparatus defined in claim 3, wherein the print cycle selector means is comprised of a rotatable disc, a series of pins protruding radially from the outer surface of the disc into apertured wall portions formed in the disc, and a resilient means for engaging a first recessed portion in the pins when the pins are partially pushed into the aperture and for engaging a second recessed portion in the pin when the pin is partially pulled out of the aperture.

6. The recording apparatus as defined in claim 3, wherein the print cycle selector means is comprised of a disc having a radially-spaced-apart wall portion extending inwardly of its outer circumference to form a series of apertures, a series of resilient arms, each arm being connected to the disc and having a bent end portion protruding into an opening formed in the wall portion, a pin having a first and second spaced-apart groove on its outer surface and each of the pins being operably connected for slidable movement in each of the apertures to a pulled-out position where it is retained in position by the bent end portion of the spring contacting the pin surface forming a first one of said grooves and into a second pushed-in position in which it is similarly retained by the bent end contacting the pin surface forming the other groove.

References Cited by the Examiner

UNITED STATES PATENTS 3,189,910  6/1965  Blakeslee _____ 346—34 X
3,216,015  11/1965  Behmoiras _____ 346—46

RICHARD B. WILKINSON, *Primary Examiner.*

J. W. HARTARY, *Assistant Examiner.*